United States Patent [19]
Lazik

[11] Patent Number: 5,237,602
[45] Date of Patent: Aug. 17, 1993

[54] REMOTELY-ACTIVATED TELEPHONE SYSTEM FOR COMMUNICATION WITH THE DISABLED

[76] Inventor: George L. Lazik, 20921 Arcane Rd., Woodland Hills, Calif. 91364

[21] Appl. No.: 857,721

[22] Filed: Mar. 25, 1992

Related U.S. Application Data

[63] Continuation of Ser. No. 591,256, Oct. 1, 1990, abandoned.

[51] Int. Cl.$^5$ .......................... H04Q 3/58; H04M 3/46
[52] U.S. Cl. ......................................... 379/38; 379/61; 379/63; 379/102
[58] Field of Search ....................... 379/38, 52, 61, 62, 379/63, 95, 102

[56] References Cited

U.S. PATENT DOCUMENTS

| | | | |
|---|---|---|---|
| 4,601,064 | 7/1986 | Shipley | 379/38 |
| 4,682,351 | 7/1987 | Makino | 379/62 |
| 4,775,996 | 10/1988 | Emerson et al. | 379/61 |
| 4,802,200 | 1/1989 | Murata et al. | 379/61 |
| 4,882,746 | 11/1989 | Shimada | 379/61 |
| 4,937,854 | 6/1990 | Sarakas | 379/188 |

FOREIGN PATENT DOCUMENTS

0388034 9/1990 European Pat. Off. .............. 379/58

*Primary Examiner*—James L. Dwyer
*Assistant Examiner*—Ahmad F. Matar
*Attorney, Agent, or Firm*—Brown, Martin, Haller & McClain

[57] ABSTRACT

A remotely-activated telephone system for remote caller controlled communication with the disabled having a master unit connected to a telephone line and at least one satellite unit. The disclosed system provides channel means for bi-directional coupling of acoustic signals between the satellite unit and the telephone line through the master unit and control means responsive to a control signal received from a remote caller by way of the telephone line. The disclosed control means allow a remote caller to select a satellite unit and to establish two-way speech communications without intervention by the disabled party.

8 Claims, 4 Drawing Sheets

REMOTELY-ACTIVATED TELEPHONE SYSTEM FOR COMMUNICATION WITH THE DISABLED

This is a continuation of application Ser. No. 07/591,256, filed Oct. 1, 1990, now abandoned.

BACKGROUND OF THE INVENTION

1. Field of the Invention

The present invention involves generally the remote control of telecommunication functions, and, more specifically, the station selection and control of a local phone receiver system for the disabled by a remote calling party to assist a disabled person.

2. Description of Related Art

Much attention has been given to the problems of the handicapped and the disabled in recent years. Rapidly increasing medical and caretaking costs continue to strongly motivate development and discovery of economically efficient methods for social integration of the handicapped and disabled. Many of these efforts are intended to provide improved means for independent self-care for the disabled. A key element for any independent self-care program for the temporarily or permanently disabled is effective access to telecommunications.

Investigators and practitioners have given particular attention to developing home telephone systems suitable for use by a handicapped or disabled person. Such a telephone system normally permits a handicapped person to communicate independently with the outside world. The typical telephone system provides means for originating outgoing telephone calls and for receiving incoming telephone calls. Absent special means, some temporarily or permanently disabled persons cannot make or receive calls on a typical telephone system. The disabled person and the calling party are limited to exchanging messages by some other means. Telephone answering machines are well-known in the art as readily available means for receiving and transmitting messages. Practitioners to date have focused on developing additional means for permitting a disabled person to use a standard telephone system to make and receive calls without considering the additional concept of passing control of the local telephone to a remote caller.

Lech Zielinski et al. U.S. Pat. No. 4,453,043 issued on Jun. 5, 1984 discloses a telephone having a transducer selected for easy actuation by the handicapped person. The transducer may, for example, be operated orally by blowing or suctioning into a mouthpiece. Zielinski et al. merely provide a physical means for operating a standard telephone in a standard manner and do not consider means for the control of the local telephone system by a remote caller.

David Lubin et al. U.S. Pat. No. 4,495,383 issued on Jan. 22, 1985 discloses an apparatus for connecting a speaker phone to a telephone network with provisions for automatic answering. Lubin et al. essentially combine automatic answering means with a speaker phone to provide automatic (hands-free) answering of incoming telephone calls and neither consider nor teach any means for the control of the local telephone system by a remote caller.

Kazuo Hashimoto U.S. Pat. No. 4,677,655 issued on Jun. 30, 1987 discloses a cordless telephone which incorporates an automatic telephone answering function within the base unit and control means within the portable unit for controlling the base unit automatic answering functions. Hashimoto discloses a useful apparatus for permitting a disabled person to operate a standard telephone with automatic answering functions remotely but neither considers nor teaches the control of the local telephone system by a remote caller.

Victor F. Emerson et al. U.S. Pat. No. 4,775,996 issued on Oct. 4, 1988 discloses a cordless telephone set which uses a combination of Radio Frequency (RF) and Infrared (IR) channel means for communicating between the base station and at least one portable device. Emerson et al. disclose a portable cordless telephone set that avoids certain government RF licensing requirements and that may be useful to the disabled but they do not consider local or remote control techniques.

Jack A. Clayton U.S. Pat. No. 4,777,474 issued on Oct. 11, 1988 discloses an alarm apparatus for the hearing impaired. Clayton's apparatus incorporates a base station connected to various alarm signal sources such as a telephone ringing signal. The base station uses RF transmission means to activate a cordless remote device containing suitable means for alerting a hearing-impaired person, such as a mechanical vibrator. Clayton does not consider means for the control of local telephone systems by a remote telephone caller.

Yoshitoshi Murata et al. U.S. Pat. No. 4,802,200 issued on Jan. 31, 1989 discloses a method and apparatus for controlling a radio telephone system of the type wherein a connection between a wired telephone channel and a plurality of cordless telephone handsets is controlled by a single base station connected to the wire telephone channel. Murata et al disclose a method for addressing incoming calls to a specific cordless handset by paging the handset and resetting the RF channel at the base station and at the paged cordless handset to establish a speech channel between the two. Murata et al. do not consider nor teach the control of a local telephone system by a remote caller.

Masatoshi Shimada U.S. Pat. No. 4,882,746 issued on Nov. 21, 1989 discloses a cordless telephone system having a master unit connected to a telephone line and having a radio transceiver and a plurality of portable subunits with radio transceivers. Speech from the telephone line can be transferred between any subunits. Speech by a press-to-talk system is enabled between any subunits by way of the master unit. A call from the telephone line can be directed to any subunit by a signal from that subunit and all subunits can also be simultaneously or sequentially connected to the telephone line. Shimada essentially discloses a typical multistation business telephone system, having intercom means and extension selection means, implemented with cordless telephones interconnected by RF means. Shimada neither considers nor discloses any means for the operational control of his telephone system by a remote caller.

Although the above art demonstrates several methods for improving telecommunications for the temporarily or permanently disabled person, nothing is known in the art for allowing a remote caller to initiate an open two-way speech channel with a disabled person anywhere in the home who is not near the phone or otherwise unable to physically respond to an incoming call signal. A remote caller is presently limited to leaving a message on an answering machine and is afforded no means for unilaterally establishing a two-way speech channel from a remote telephone. In situations where a disabled person lives alone, this means that a remote caller has no means for checking on the welfare of the disabled person by telephone and is obliged to personally visit to confirm the subject's welfare whenever the telephone goes unanswered.

Several practitioners have implemented systems whereby the disabled or aged person can initiate a call for assistance to an outside service. These systems require the disabled or aged person to carry a medallion-type signalling device that must be activated to initiate the call. Moreover, these systems require an injured patient to be in a clear state of mind so that he or she does, in fact, activate the medallion's button. Experience with these types of systems has clearly demonstrated that the aged person frequently neglects to wear the device and, even when wearing it, is too confused or disabled at the time of need to properly activate it.

The lack of means for telephonic confirmation of the welfare of temporarily or permanently disabled individuals seriously limits the independence and self-care options for such disabled people, and increases the anxiety and burdens of the care-giving friends and relatives. These unresolved problems and deficiencies are clearly felt in the art and are solved by the present invention in the manner described below.

SUMMARY OF THE INVENTION

The primary advantage of the present invention is that it provides the means for a calling party to establish two-way speech communication with a second party by telephone when the second party is not near the phone or otherwise unable to physically answer the telephone, provided that the present invention is installed at the site of the second party. For example, consider the situation where an older person has a widowed, aged parent living alone. A common problem occurs when the older person makes a call to the parent's residence that goes unanswered. The younger relative, after repeated attempts, often becomes distraught and attempts to reach paramedics or neighbors to check on the condition of the aged parent. If possible, the caller usually also rushes over to the parent's residence.

With the present invention installed in the parent's home, two-way communications can be quickly established over the telephone between the caller and the parent. This is possible even if the parent is, say, disabled with a fractured hip and unable to answer the phone or merely sleeping. The remote calling party can determine the status of the disabled parent and take the proper action without unnecessary alarm.

An advantage of the present invention is that the disabled or aged parent need not wear anything or take any action whatsoever. The initiation and routing of the call is entirely under the control of the remote caller.

Another advantage of the present invention is that it provides the means for monitoring the installed premises from a remote telephone for sounds of intruders or other noisy events. The present invention, by permitting local system control from a remote calling location, allows a caller with the proper authorization code to monitor every area equipped with an extension or satellite unit within a premises.

The present invention consists of a master unit and at least one satellite unit. The master unit is connected to the telephone line by means of an RJ11 telephone jack and is connected to the local electrical outlet from which it receives its power. The system installer can program the master unit with a four-digit master security code that is later used for authenticating remote caller access. Other features provide for setting the number of rings required before the telephone is answered, for testing the entire system, and for addressing individual satellite units. The programming and testing functions are performed by the installer with a local telephone handset connected to the master unit, whereby all remote caller command functions can be simulated.

The satellite units are connected to electrical outlets at selected locations throughout the home. Each satellite unit contains a sensitive microphone, a speaker and a ten-position unit identification switch. The master unit communicates with all satellite units by means of FM signals either through the home's electrical wiring using common carrier technology or through direct electromagnetic radiation. All units contain FM transmitters and receivers. Two FM carrier frequencies are required. The master unit uses one carrier frequency to simultaneously address all satellite units. The satellite units use another carrier frequency to transmit to the master unit.

The remote calling party selects the satellite unit to be addressed by pressing the unit select code number on his telephone keypad. A two-way speech channel is then established between the selected satellite unit and the remote caller by way of the master unit. The remote caller may select a different satellite unit at any time merely by pressing another key on his telephone keypad. Thus, the remote caller can move through the home from satellite unit to satellite unit by means of his telephone keypad. The remote caller may broadcast a message simultaneously from all satellite units by using a defined key. Thus, the remote caller can broadcast an inquiry message over all satellite units and then step through the satellite units, one by one, in search of a response.

The foregoing, together with other features and advantages of the present invention will become more apparent when referring to the following specifications, claims and accompanying drawings.

BRIEF DESCRIPTION OF THE DRAWINGS

For a more complete understanding of the present invention, reference is now made to the following detailed description of the embodiment illustrated in the accompanying drawings, wherein:

FIG. 1, comprising

DESCRIPTION OF THE PREFERRED EMBODIMENT

Figure 1A:
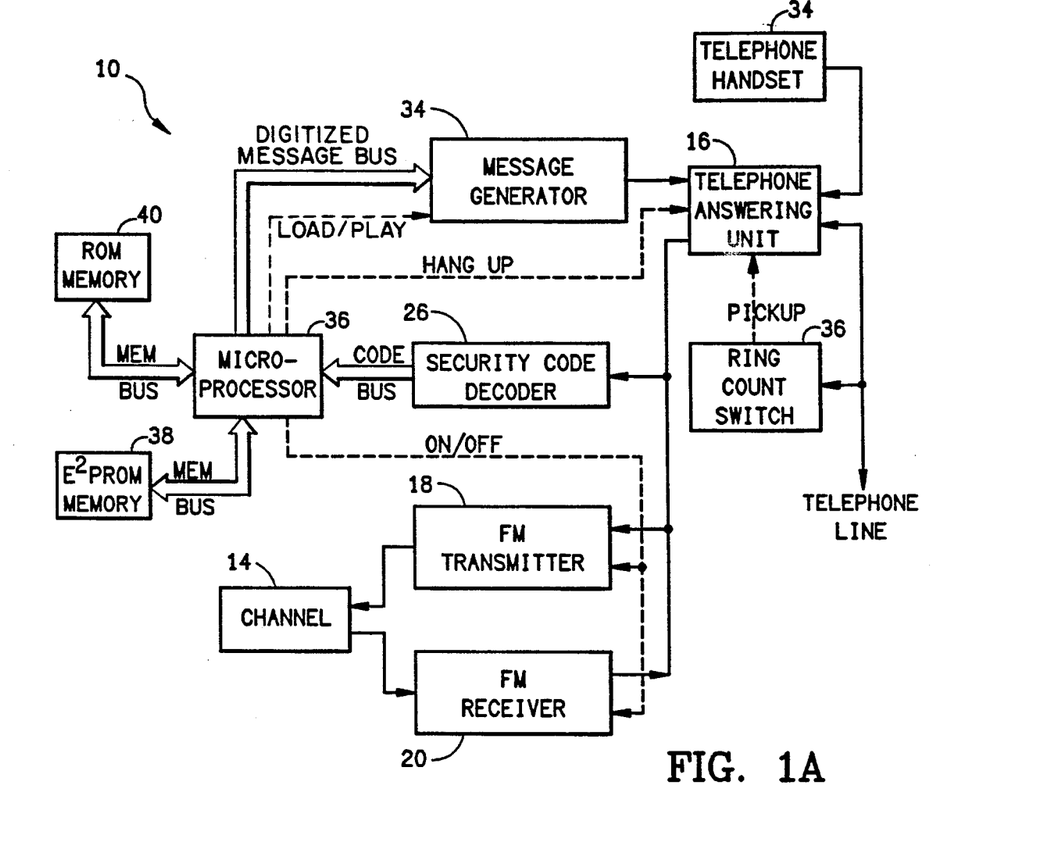
FIGS. 1A and 1B, shows the functional block diagrams for the master unit and the satellite unit.
Figure 1B:
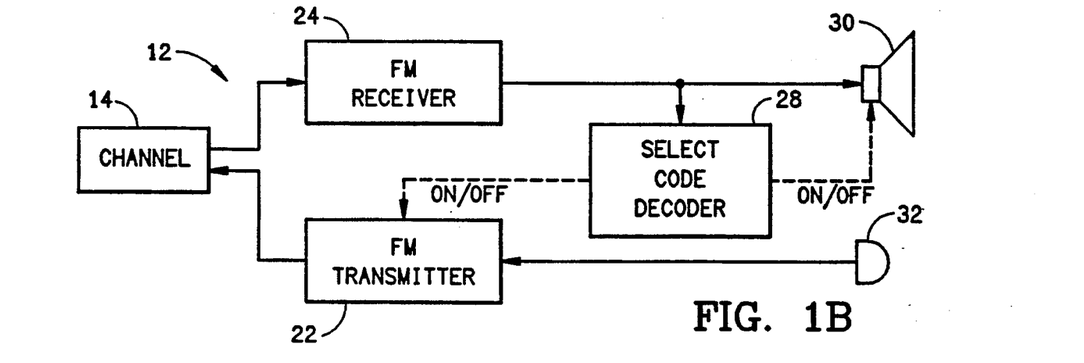

The present invention includes the two components shown in FIG. 1. FIG. 1A shows the master unit 10 and FIG. 1B shows the satellite unit 12. A remotely-activated telephone system (RATS) includes one master unit 10 and from one to ten addressable satellite units 12. Master unit 10 communicates with satellite unit 12 by means of a channel 14. In the preferred embodiment, channel 14 may be the power wiring system of a house or a simple electromagnetic propagation channel for Frequency Modulated (FM) radio waves. Master unit 10 includes a telephone answering unit 16, which is connected to the telephone line by means of a standard RJ11 phone plug. Telephone answering unit 16 also may have a second RJ11 jack to permit simultaneous connection of a standard telephone handset 34 to the same telephone line. Telephone answering unit 16 will connect the telephone line to an FM transmitter 18 upon receipt of an incoming call. FM transmitter 18 and a FM receiver 20 provide two-way speech transmission between channel 14 and the telephone line by way of telephone answering unit 16.

Satellite unit 12 shown in FIG. 1B also includes a FM transmitter 22 and a FM receiver 24 connected to channel 14. In FIG. 1A, a security code decoder 26 is connected to telephone answering unit 16. Security code decoder 26 converts touch-tone signals to digital signals and transfers the digital code signal on a code bus to microprocessor 36. Microprocessor 36 receives the security code and compares it with the master security code stored in E$^2$PROM memory 38. If the security code is authorized, microprocessor 36 will activate FM transmitter 18 and FM receiver 20. In FIG. 1B, a select code decoder 28 performs a similar function by activating and deactivating FM transmitter 22 and speaker 30 in accordance with a satellite unit selection protocol. Activation of FM transmitter 22 effectively connects a microphone 32 to channel 14.

In FIG. 1A, a message generator 34 is connected to telephone answering unit 16 to permit announcement to the calling party when telephone answering unit 16 first connects to the telephone line. A ring counter switch 36 is also provided in master unit 1. Ring counter switch 36 issues a command to telephone answering unit 16 to answer a call by connecting to the telephone line after counting a selectable number of ring signals on the telephone line.

In operation, a four-digit master security code is installed in master unit 10 by means of standard touch-tone telephone keypad 34. Master security code installation and system testing requires the temporary connection of standard touch-tone telephone handset 34 to telephone answering unit 16 so that the installer can insert a master security code into a memory register in E$^2$PROM memory 38 by passing the code through decoder 26 to microprocessor 36. A switch (not shown) in ring counter switch 36 may also be set by the user to select an answering delay that permits the user to pick up telephone handset 34 before telephone answering unit 16 connects to the telephone line.

When a remote caller makes a call to the telephone number at which the RATS has been installed, telephone answering unit 16 connects to the telephone line after receiving a pick-up command from ring counter switch 36, which issues after the selected number of ring signals have been received. Message generator 34 then instructs the remote calling party to enter the proper security code on the remote touch-tone keypad. The remote caller must then enter a four-digit numeric code which matches the master security code stored in E$^2$PROM memory 38. As the remote caller enters his security code, security code decoder 26 translates the touch-tone signals to a digital code and transfers this code on a code bus to microprocessor 36. Microprocessor 36 compares the entered code with the master security code stored in E$^2$PROM memory 38. If the security code is authorized, microprocessor 36 turns on both FM transmitter 18 and FM transmitter 20 by means of a control line, thereby opening a speech channel between the telephone line and channel 14. Once the speech channel is established, two-way communications can be selectively established by the remote caller to the various satellite units.

If the security code is not authorized, microprocessor 36 first retrieves a message code from memory 38 and transfers it on a digitized message bus to message generator 34. Microprocessor 36 then commands message generator 34 to play the new message. Message generator 34 plays the message, which instructs the remote caller to re-attempt the proper security code. After a determinant number of unsuccessful attempts, microprocessor 36 commands telephone answering unit 16 to hang up. These and other microprocessor 36 functions occur under stored-program control. The program software is stored in ROM memory 40, which is connected to microprocessor 36 by a memory bus.

It will be noted that the individual functions described herein are interconnected by three types of connections, as shown in FIGS. 1A and 1B. The three connections are schematically represented as solid lines, dashed lines, and double solid lines. The solid lines represent audio and speech signals, the dashed lines represent control signals and the double solid lines represent digital data bus connections. All such interconnections are well-known in the electronics arts.

Master unit 10 communicates with all satellite units 12 through channel 14 by means of FM signals. Channel 14 can be the electrical wiring system within the home or direct propagation of electromagnetic radiation through space. Two FM carrier frequencies are necessary for proper operation. FM transmitter 18 and FM receiver 24 are tuned to a first FM carrier frequency FM transmitter 22 and FM receiver 20 are tuned to a second FM carrier frequency. FM receiver 24 in satellite unit 12 is always active and receiving transmissions from FM transmitter 18 and master unit 10. Only a single satellite unit 12 can be received at a time.

The remote calling party selects the satellite unit to be activated merely by pressing one of the telephone touch-tone keys. The touch-tone signal is received at master unit 1 and transmitted through channel 14 to FM receiver 24 and from there to select code decoder 28. If select code decoder 28 receives a touch-tone select code identical to the setting on an internal unit identification switch (not shown), then FM transmitter 22 and speaker 30 are activated by commands from select code decoder 28. Activation of speaker 30 immediately establishes incoming speech connection between the telephone line and speaker 30 by way of telephone answering unit 16, FM transmitter 18, channel 14, and FM receiver 24. Activation of FM transmitter 22 immediately establishes an outgoing speech connection between microphone 32 and the telephone line by way of FM transmitter 22, channel 14, FM receiver 20, and telephone answering unit 16. If select code decoder 28 does not recognize the touch-tone select code, then FM transmitter 22 and speaker 30 are affirmatively deactivated.

In the preferred embodiment, satellite unit 12 is plugged into an electrical outlet (not shown) at a selected location within the home. Satellite unit 12 is not connected to the telephone line. Each satellite unit 12 includes microphone 32 and speaker 30. Select code decoder 28 includes a multiposition unit identification switch (SW1 in FIG. 2) and a speaker on-off switch (SW2 in FIG. 4). Each satellite unit 12 also contains means for indicating connection of AC power and selection of the unit. This means can be a light-emitting diode.

When satellite unit 12 is selected, an indicator (D2 in FIG. 2) is activated and an audible tone is produced from speaker 30. Unless speaker on-off switch SW2 within select code decoder 28 is on, no tone or sound is heard through speaker 30. If speaker 30 is enabled, all words spoken by the remote caller will be reproduced through speaker 30 at selected satellite unit 12. Similarly, any sounds picked up by microphone 32 will be heard at the remote caller's telephone. The remote caller may select a different satellite unit 12 at any time by pressing another touch-tone key. In this way, the remote caller may randomly select satellite units throughout the home and establish two-way communications with anyone in the vicinity of the selected satellite unit.

The "#" key on the remote caller's telephone is assigned a special function. This key will simultaneously activate all satellite units and permit a general broadcast by the remote caller throughout the home. When satellite unit 12 is in the broadcast mode, speaker 30 is activated, but FM transmitter 22 is not. This broadcast mode permits the remote caller to transmit a message to all satellite units and then selectively scan the units individually for a reply.

Figure 2:
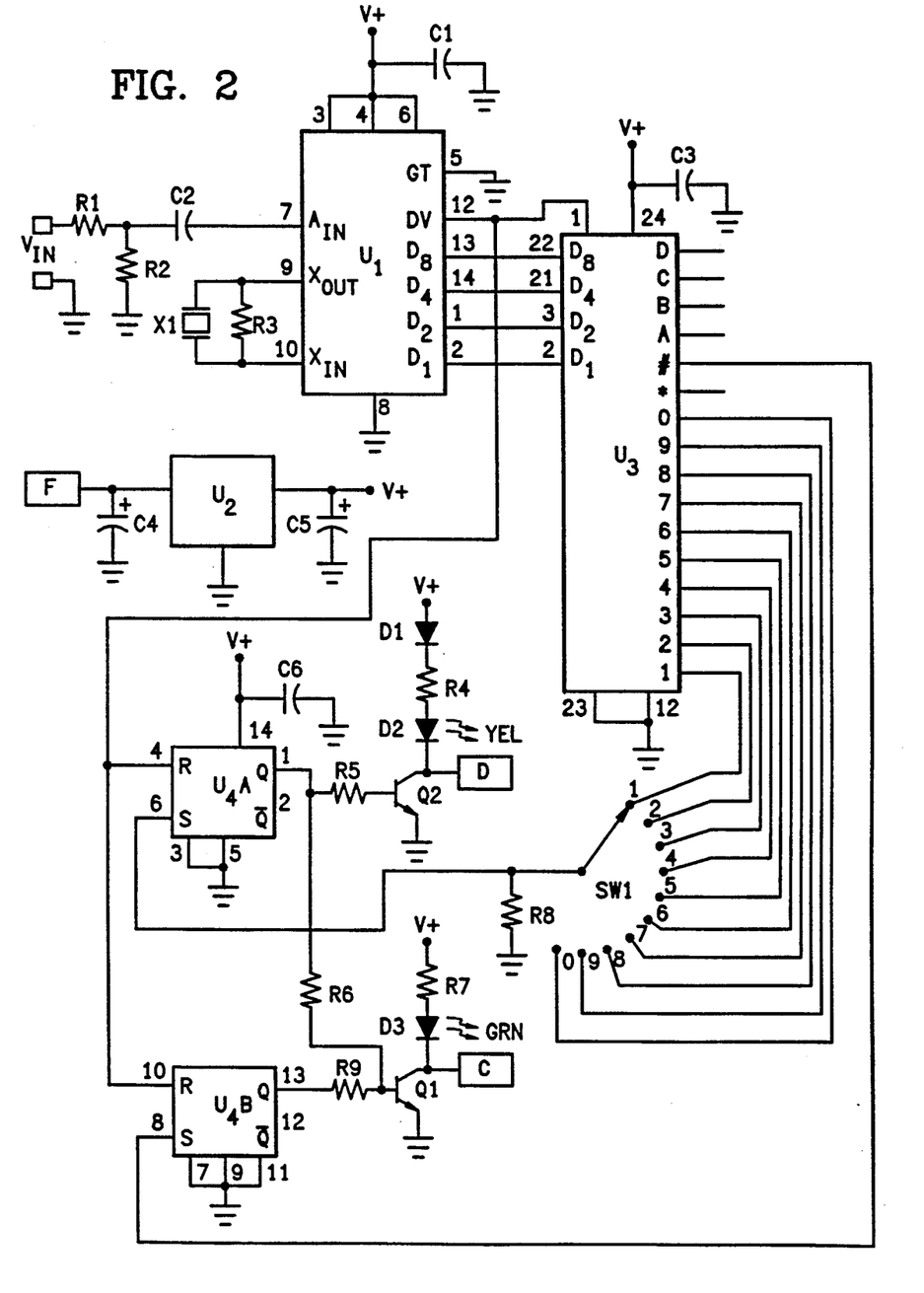
FIG. 2 provides a detailed embodiment of the decoder means.

FIG. 2 provides a detailed circuit diagram for an illustrated embodiment of select code decoder 28. The individual circuit components are further defined in FIG. 5. The touch-tone select code transmitted by the remote caller is presented as $V_{IN}$ in FIG. 2. U1 is a known dual-tone receiver that decodes the touch-tone signal and provides a four-bit binary signal output to U3. U3 further decodes the four-bit binary signal and raises the voltage on only one of the sixteen output lines shown. SW1 is the local satellite unit selection switch, which is set by the user to one of ten available settings. When U3 raises the voltage on the line selected by SW1, flip-flop U4A is set and the Q-output of U4A goes high. This high output activates Q1 and Q2, which conduct current to ground from V+ through yellow LED D2. The yellow light signifies selection of the local satellite unit.

The local FM transmitter is activated by Q2 and the local speaker is activated by the conduction through Q1. When the remote caller presses "#", flip-flop U4B is set. When U4B is set, only Q1 conducts and speaker 30 is activated but FM transmitter 22 is not activated. When Q1 alone conducts, green LED D3 emits a green light indicating that the satellite unit is in the broadcast mode.

When the remote caller transmits a new select signal, pin 12 of U1 goes high and flip-flops U4A and U4B are both reset, switching both transistors Q1 and Q2 to a nonconducting state. This affirmatively deactivates LED's D2 and D3 and both the speaker and FM transmitter activation signals, (C) and (D), thereby preventing simultaneous activation of more than one satellite unit.

Figure 3:
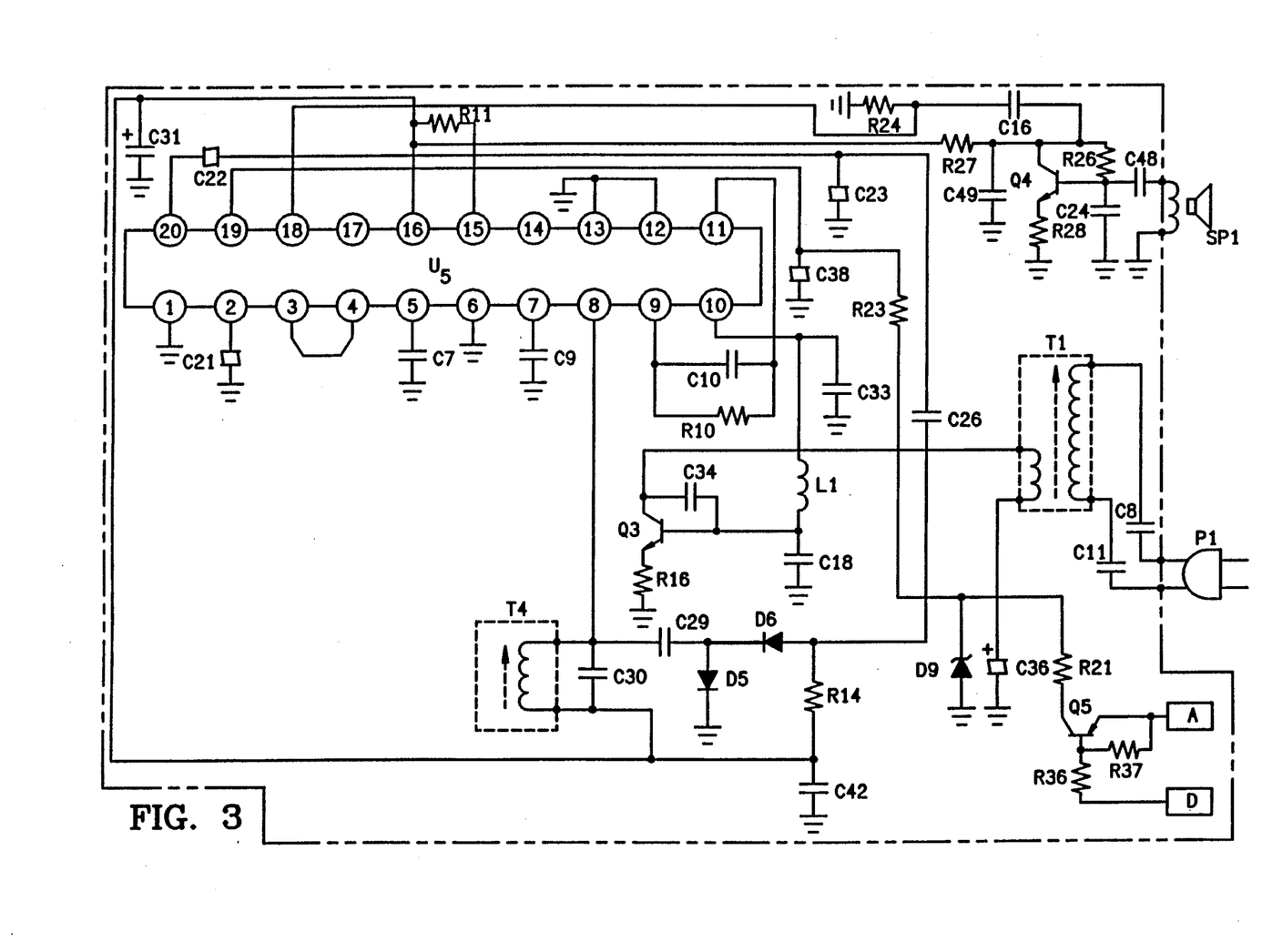
FIG. 3 provides a detailed embodiment of the satellite transmitter means.

FIG. 3 provides a detailed circuit diagram for an illustrated embodiment of FM transmitter 22 in satellite unit 12. The individual circuit components are further defined in FIG. 5. Integrated circuit U5 is an FM transceiver well-known in the electronics arts. SP1 acts as a microphone in this embodiment and the microphone signal is amplified through transistor Q4. The amplified microphone signal at the collector of Q4 is filtered and connected to the modulator input at pin 16 of U5. Modulated RF output from U5 at pin 10 is filtered and amplified by transistor Q3. Amplified output of transistor Q3 is connected through transformer T1 to the local house wiring by way of plug P1. An alternative embodiment using direct electromagnetic radiation through space to form channel 14 requires an appropriate FM antenna at P1. The signal from select code decoder 28 at (D) activates the FM transmitter by causing transistor Q5 to conduct. When transistor Q5 conducts, the positive DC power supply at (A) is connected to pin 19 of U5, thereby activating U5. Tunable transformer T4 can be adjusted to select the desired FM carrier frequency for the transmitter.

Figure 4:
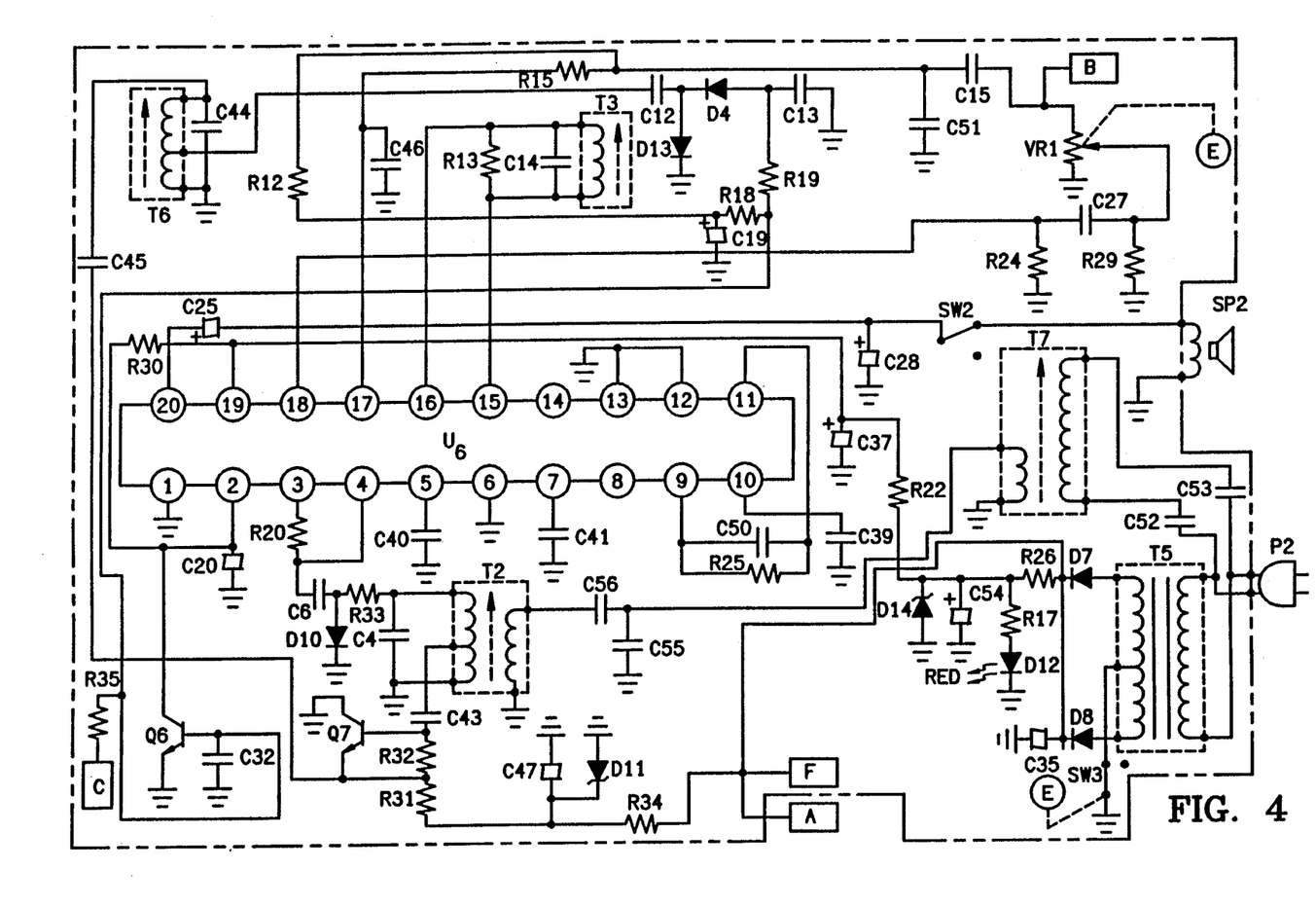
FIG. 4 provides a detailed embodiment of the satellite receiver means.

FIG. 4 provides a detailed circuit diagram for an illustrated embodiment of FM receiver 24 in satellite unit 12. The individual circuit components are further defined in Appendix A. Integrated circuit U6 is a FM transceiver circuit well-known in the art. The signal (C) from select code decoder 28 enables speaker SP2 by causing transistor Q6 to conduct. This is done by activating the squelch circuit connected to pins 15 and 16 of U6. VR1 and SW3 form an on-off power switch and volume control of a known type for adjusting the volume to speaker SP2. Transformer T5 and diodes D7 and D8 form a power supply that generates the necessary DC voltages for the several circuits within satellite unit 12, using methods well-known in the art. D2 is connected to 120 volts 60 Hz AC power through the local house wiring. The FM signal present on the household wiring is extracted from plug P2 by transformer T1 and is amplified in the circuit comprising transformer T2 and transistor Q3. The filtered and amplified FM signal from plug P2 is then directed to pin 17 of U6. Transformer T6 is tunable and serves to select the FM frequency to be received by U6. The incoming FM signal is also filtered through transformer T3 and connected to pins 15 and 16 of U6, providing a squelch function known in the art.

The other features of the illustrated embodiments shown in FIGS. 2 through 4 will be readily understood by all practitioners in the electronics arts, as these features are well-known and understood in the arts. The detailed embodiments in FIGS. 2 through 4 are presented to demonstrate that the features claimed and described in FIG. 1B can be readily and easily implemented, in the light of these teachings, using well-known electronic techniques. The elements of master unit 10 shown in FIG. A can also be readily and easily implemented in a manner similar to that illustrated in FIGS. 2 through 4 for satellite unit 12.

Obviously, other embodiments and modifications of the invention will occur readily to those of ordinary skill in the art in view of these teachings. Therefore, this invention is to be limited only by the following claims, which include all such obvious embodiments and modifications when viewed in conjunction with the above specification and accompanying drawings.

APPENDIX A: Component Parts List

The following tables identify the component parts included in FIGS. 2-4 of the drawings.

Resistors (OHMS)

-continued

APPENDIX A: Component Parts List
The following tables identify the component parts included in FIGS. 2-4 of the drawings.

| | | | | | | | | |
|---|---|---|---|---|---|---|---|---|
| R1 | 10K | R8 | 100K | R15 | 33K | R22 | 39 | R29 | 68K |
| R2 | 20K | R9 | 10K | R16 | 3.3 | R23 | 39 | R30 | 470K |
| R3 | 1M | R10 | 330K | R17 | 560 | R24 | 820K | R31 | 2.7K |
| R4 | 220 | R11 | 68K | R18 | 240K | R25 | 330 | R32 | 470 |
| R5 | 10K | R12 | 82K | R19 | 470K | R26 | 82(2W) | R33 | 4.7K |
| R6 | 10K | R13 | 68K | R20 | 33 | R27 | 12K | R34 | 560 |
| R7 | 220 | R14 | 220K | R21 | 82(2W) | R28 | 1K | R35 | 100K |
| | | | | | | | | R36 | 47K |
| | | | | | | | | R37 | 10K |

Capacitors (Microfarads)

| | | | | | | | | | |
|---|---|---|---|---|---|---|---|---|---|
| C1 | 0.01 | C13 | 0.1 | C25 | 47/10 V | C37 | 47/10 V | C49 | 2200 p |
| C2 | 0.01 | C14 | 180 p | C26 | 0.018 | C38 | 47/10 V | C50 | 10 p |
| C3 | 0.01 | C15 | 0.01 | C27 | 3900 p | C39 | 1800 p | C51 | 2200 p |
| C4 | 2.2/16 V | C16 | 3900 p | C28 | 0.47/50 V | C40 | 0.01 | C52 | 4700 p |
| C5 | 2.2/16 V | C17 | 0.01 | C29 | 120 p | C41 | 0.01 | C53 | 4700 p |
| C6 | 0.01 | C18 | 2200 p | C30 | 950 p | C42 | 0.01 | C54 | 470/10 V |
| C7 | 0.01 | C19 | 10/16 V | C31 | 10/16 V | C43 | 33 p | C55 | 0.022 |
| C8 | 4700 p | C20 | 2.2/50 V | C32 | 0.01 | C44 | 720 p | C56 | 0.033 |
| C9 | 0.01 | C21 | 2.2/50 V | C33 | 1800 p | C45 | 100 p | | |
| C10 | 10 p | C22 | 47/10 V | C34 | 24 p | C46 | 4700 p | | |
| C11 | 4700 p | C23 | 0.47/50 V | C35 | 330/25 V | C47 | 47/10 V | | |
| C12 | 1000 p | C24 | 0.01 | C36 | 470/10 V | C48 | 0.01 | | |

DIODES

| | | |
|---|---|---|
| D1 - Silicon Diode | D6 - Signal Rectifier | D11 - Zener Diode (10 V) |
| D2 - LED (yellow) | D7 - Signal Recitifier | D12 - LED (red) |
| D3 - LED (green) | D8 - Power Rectifier | D13 - Signal Rectifier |
| D4 - Signal Rectifier | D9 - Zoner Diode (10 V) | D14 - Zener Diode (10 V) |
| D5 - Signal Rectifier | D10 - Signal Rectifier | |

INDUCTORS AND TRANSFORMERS

| | | | |
|---|---|---|---|
| L1 | 1000 µH | T4 | LC Inductor |
| T1 | Isolation (FM) | T5 | CT Power (60 Hz) |
| T2 | CT FM Detector | T6 | CT FM Detector |
| T3 | RLC Inductor | T7 | Isolation (FM) |

TRANSISTORS AND MICROCIRCUITS

| | | | | | |
|---|---|---|---|---|---|
| Q1 | NPN (Switch) | Q6 | NPN (Switch) | U4 | CD4013B |
| Q2 | NPN (Switch) | Q7 | NPN (FM) | U5 | LM1868N |
| Q3 | NPN (FM) | U1 | MC14543C | U6 | LM1868N |
| Q4 | NPN (Audio) | U2 | 7805 | | |
| Q5 | PNP (Switch) | U3 | CD4514BE | | |

OTHER COMPONENTS

| | | | |
|---|---|---|---|
| SW1 | 1P11T Rotary Selector | X1 | 3.579545MHz Crystal |
| SW2 | 1P1T Speaker Slide | | |
| SW3 | 1P1T Power | | |

I claim:

1. A phone system for remote caller controlled communication with the disabled comprising:
   master unit connected to a telephone line for answering an incoming call from a remote caller;
   a plurality of satellite units each having a microphone and a speaker;
   channel means for bi-directional coupling of acoustic signals between each said satellite unit and said telephone line through said master unit; and
   control means responsive to a select code signal received from said remote caller by way of said telephone line after said master unit has answered said incoming call, said control means comprising at least one of:
   selection control means responsive to said select code signal for selecting one said satellite unit and for connecting said microphone of said selected satellite unit to said channel means; and
   broadcast control means responsive to said select code signal for connecting said speakers of all said satellite units to said channel means simultaneously.

2. The telephone system described in claim 1 further comprising access control security means for evaluating the privilege of said remote caller for access to said control means and for denying said access to said remote caller without a selected privilege.

3. The telephone system described in claim 2, wherein said channel means comprises:
   at least one Frequency Modulation (FM) radio transmitter and receiver means disposed in said master unit and at least one FM radio transmitter and receiver means disposed in each said satellite unit.

4. A telephone system for remote caller controlled communication with the disabled comprising:
   a master unit connected to a telephone line;
   a first FM transmitter and receiver within said master unit;
   a security code decoder means for evaluating a security code signal received from a remote caller by way of said telephone line after said master unit has answered a telephone call from said remote caller;
   a plurality of satellite units;
   a second FM transmitter and receiver within each said satellite unit;
   a microphone and speaker within each said satellite unit; and select code decoder means within each said satellite unit for activating said microphone and speaker of said satellite unit in response to a satellite unit select code signal received from a remote caller by way of said telephone line after said master unit has answered a telephone call from said remote caller.

5. The telephone system described in claim 4 wherein said first and second FM transmitters and receivers are connected to a local power line so that FM signals are propagated on said local power line.

6. The telephone system described in claim 4 further comprising ring signal counting means for connecting said master unit to said telephone line in response to detection of a selected number of ring signals on said telephone line.

7. The telephone system described in claim 6 further comprising a message generator for repeating an outgoing message to a remote caller in response to connection of said master unit to said telephone line.

8. A method for controlling by a remote caller of a telephone system of the type wherein a connection between a telephone line and one or more satellite units each having at least one acoustic transducer means is accomplished through a single master unit having transmitter and a receiver means, said method comprising the steps of:
   detecting a ring signal on said telephone line;
   establishing a connection with said telephone line in response to said ring signal;
   detecting a security code signal on said telephone line;
   decoding said security code signal;
   authenticating said security code signal and interrupting said connection with said telephone line in response to failure of authentication;
   detecting a select code signal on said telephone line;
   decoding said select code signal;
   selecting at least one satellite unit for connection to said telephone line in accordance with said select code signal; and
   connecting at least one said acoustic transducer means of each said selected satellite unit to said telephone line.

* * * * *